US009565464B2

(12) United States Patent
Anandakumar et al.

(10) Patent No.: US 9,565,464 B2
(45) Date of Patent: *Feb. 7, 2017

(54) METHOD AND SYSTEM FOR MULTI-PATH VIDEO AND NETWORK CHANNELS

(71) Applicant: MaxLinear, Inc., Carlsbad, CA (US)

(72) Inventors: Anand Anandakumar, San Diego, CA (US); Sheng Ye, Carlsbad, CA (US); Curtis Ling, Carlsbad, CA (US)

(73) Assignee: Maxlinear, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/988,338

(22) Filed: Jan. 5, 2016

(65) Prior Publication Data

US 2016/0134921 A1 May 12, 2016

Related U.S. Application Data

(63) Continuation of application No. 14/557,282, filed on Dec. 1, 2014, now Pat. No. 9,232,262, which is a continuation of application No. 13/674,008, filed on Nov. 10, 2012, now Pat. No. 8,909,819.

(60) Provisional application No. 61/558,852, filed on Nov. 11, 2011.

(51) Int. Cl.
| | |
|---|---|
| *G06F 3/00* | (2006.01) |
| *H03K 9/00* | (2006.01) |
| *H04N 21/426* | (2011.01) |
| *H04N 5/44* | (2011.01) |
| *H04N 5/50* | (2006.01) |
| *H04N 21/438* | (2011.01) |
| *H04N 21/443* | (2011.01) |

(Continued)

(52) U.S. Cl.
CPC .......... *H04N 21/4263* (2013.01); *H04N 5/44* (2013.01); *H04N 5/50* (2013.01); *H04N 21/4383* (2013.01); *H04N 21/4436* (2013.01); *H04N 21/4622* (2013.01); *H04N 21/6143* (2013.01)

(58) Field of Classification Search
CPC .. H04W 88/06; H04N 5/4401; H04N 21/4263
See application file for complete search history.

(56) References Cited

U.S. PATENT DOCUMENTS

| 7,043,564 B1 * | 5/2006 | Cook ................ H04L 29/12009 |
|---|---|---|
| | | 709/223 |
| 2007/0030116 A1 | 2/2007 | Feher |

(Continued)

*Primary Examiner* — Hyun Nam
(74) *Attorney, Agent, or Firm* — McAndrews Held & Malloy (57) ABSTRACT

Methods and systems for multi-path video and network channels may comprise a communication device comprising a wideband path (WB) and a narrowband path (NB). A video channel and a network channel may be received in the WB when the device is operating in a first stage. A video channel and a network channel may be received in the WB and the network channel may also be received in the NB when the device is operating in a second stage. The network channel may be received in the NB when the device is operating in a third stage. The reception of the network channel from both the WB and NB may enable a continuous reception of the network channel in a transition between the first and third stages. The WB may be operable to receive a plurality of channels and the NB may be operable to receive a single channel.

22 Claims, 7 Drawing Sheets

(51) Int. Cl.
*H04N 21/462* (2011.01)
*H04N 21/61* (2011.01)

(56) References Cited

U.S. PATENT DOCUMENTS

| | | | |
|---|---|---|---|
| 2007/0160038 A1* | 7/2007 | Liu | H04N 7/163 |
| | | | 370/389 |
| 2011/0206162 A1 | 8/2011 | Lococo et al. | |
| 2015/0135237 A1* | 5/2015 | Anandakumar | H04N 5/44 |
| | | | 725/68 |

* cited by examiner

METHOD AND SYSTEM FOR MULTI-PATH VIDEO AND NETWORK CHANNELS

CROSS-REFERENCE TO RELATED APPLICATIONS/INCORPORATION BY REFERENCE

This application is a continuation of application Ser. No. 14/557,282 filed on Dec. 1, 2014, which is a continuation of application Ser. No. 13/674,008 filed on Nov. 10, 2012, which makes reference to and claims priority to U.S. Provisional Application Ser. No. 61/558,852 filed on Nov. 11, 2011, and U.S. Provisional Application No. 61/559,416 filed on Nov. 14, 2011, each of which is incorporated herein by reference in its entirety.

FIELD OF THE INVENTION

Certain embodiments of the invention relate to wireless communication. More specifically, certain embodiments of the invention relate to a method and system for multi-path video and network channels.

BACKGROUND OF THE INVENTION

Satellite television has advanced from an expensive hobbyist-only technology to a ubiquitous residential television service that rivals cable television, primarily due to reductions in the cost of satellite television reception technology.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for multi-path video and network channels, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for multi-path video and network channels. Exemplary aspects of the invention may comprise a communication device comprising a wideband path and a narrowband path, wherein the wideband path may be operable to receive a plurality of channels and the narrowband path may be operable to receive a single channel. A plurality of video channels and a network channel may be received in the wideband path when the communication device is operating in a first stage. A plurality of video channels and a network channel may be received in the wideband path and the network channel may also be received in the narrowband path when the communication device is operating in a second stage. The network channel may be received in the narrowband path when the communication device is operating in a third stage. The second stage may comprise a transition from the first stage to the third stage and from the third stage to the first stage. The wideband path may comprise a wideband tuner that is operable to tune to a plurality of channels concurrently and said narrowband path may comprise a narrowband tuner that is operable to tune to a single channel at a time. The wideband path may comprise a wideband radio frequency (RF) module and a wideband channelization module and the narrowband path may comprise a narrowband RF module and a narrowband channelization module. A network channel may be selected from the network channel received by the wideband channelization module and the network channel received by the narrowband channelization module utilizing a crossbar. One or more of the received video channels may be processed utilizing a backend module in the communication device for output to a display device. The narrowband path may be configured in a powered down state when the communication device is operating in the first stage and the wideband path may be configured in a powered down state when the communication device is operating in the third stage. The reception of the network channel from both the wideband path and the narrowband path may enable a continuous reception of the network channel in a transition between the first stage and the third stage.

As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the terms "block" and "module" refer to functions than can be implemented in hardware, software, firmware, or any combination of one or more thereof. As utilized herein, the term "exemplary" means serving as a non-limiting example, instance, or illustration. As utilized herein, the term "e.g.," introduces a list of one or more non-limiting examples, instances, or illustrations.

Figure 1:
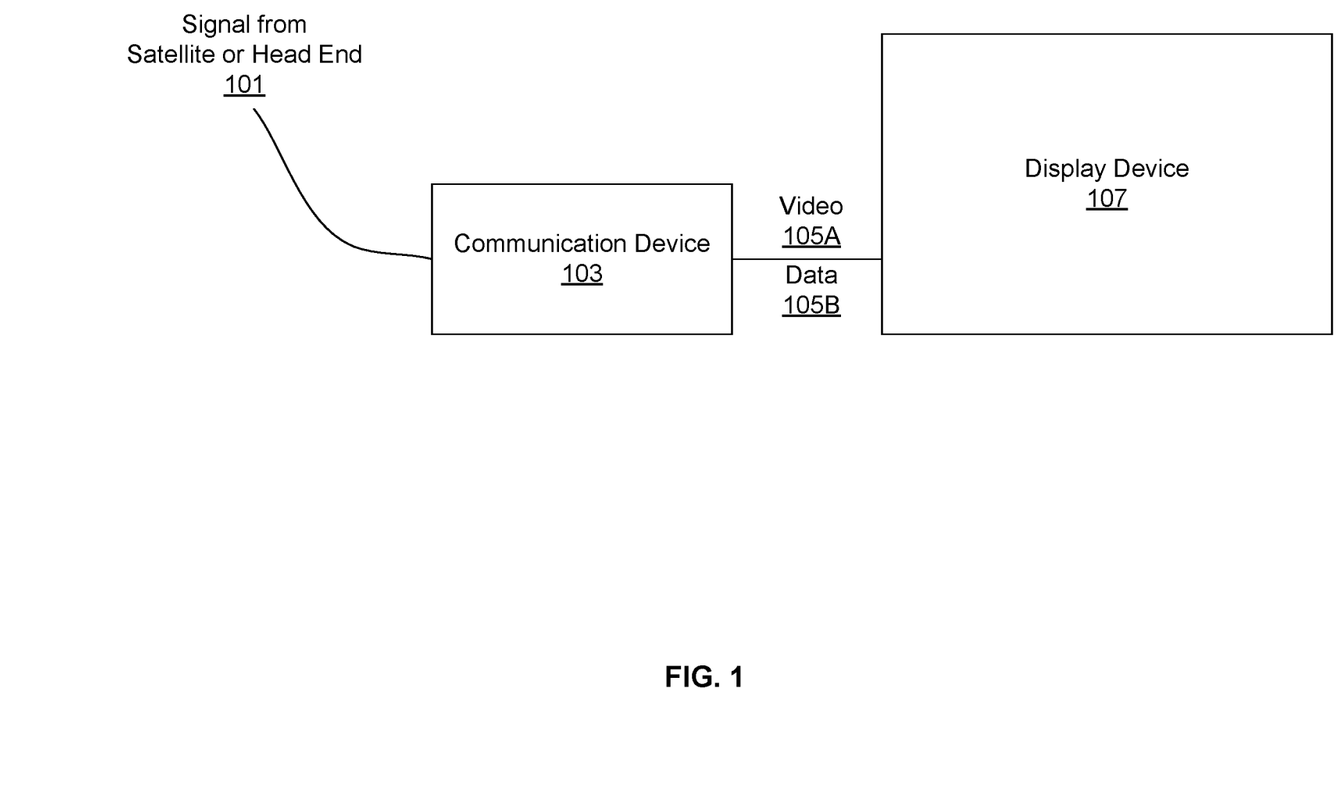
FIG. 1 is a block diagram of an exemplary multimedia receiver system in accordance with an embodiment of the invention.

FIG. 1 is a block diagram of an example multimedia receiver system in accordance with an embodiment of the invention. Referring to FIG. 1, there is shown a signal input 101, a communication device 103, a video signal 105A, a data signal 105B, and a display device 107. The input signal 101 may comprise a signal from a satellite dish or a cable television head end, for example. Alternatively, the signal from the satellite dish or from a gateway device, not shown, may be received at the communication device 103 wirelessly. Accordingly, the communication device 103 may comprise wireless capability, such as a WiFi front end and associated processing circuitry.

The display device 107 may comprise a high-definition television (HDTV) television, for example, which may be operable to receive audio and video signals from the communication device 103 and broadcast them for viewing. The communication device 103 may comprise a multi-mode receiver, such as a set-top box, for example, that may be operable to receive the input signal 101 and output the video signal 105A and the data signal 105B.

The communication device 103 may be multi-mode in that it may be operable to receive video and network channels in separate paths or in the same path, as described further in FIGS. 2-7. The video signal 105A may comprise audio and video data for playback by the display device 107, whereas the data signal 105B may comprise programming information, such as available television program schedules.

In operation, the communication device 103 may generally have two use cases that have power impact. The first case is video mode, in which videos are watched in multiple channels. In addition, data such an electronic program guide (EPG) may be received in one channel, called a network channel. Second is network channel mode, where videos are off, but the network channel is on to update the data, such as the EPG. In an exemplary embodiment, the communication device 103 may have two power modes, one power mode optimized for the first case and another power mode optimized for the second case. In addition, the receiver may provide a transition or hand over from the two modes that is seamless or glitch free.

In the video mode, the receiver may be in a wideband configuration. In an exemplary scenario, the wideband configuration may capture the entire satellite spectrum, 950-2150 MHz, and may provide multiple video channels as well as the network channel. In the wideband configuration, by turning on only the required channels, low power consumption may be achieved.

In the network channel mode, the multi-mode receiver 103 may be in a narrow band configuration. The narrow band configuration may provide a single channel, while consuming lower power. Switching between wide band and narrow band, and vice versa, may be achieved through a hand over process that enables glitch free network channel operation.

Figure 2:
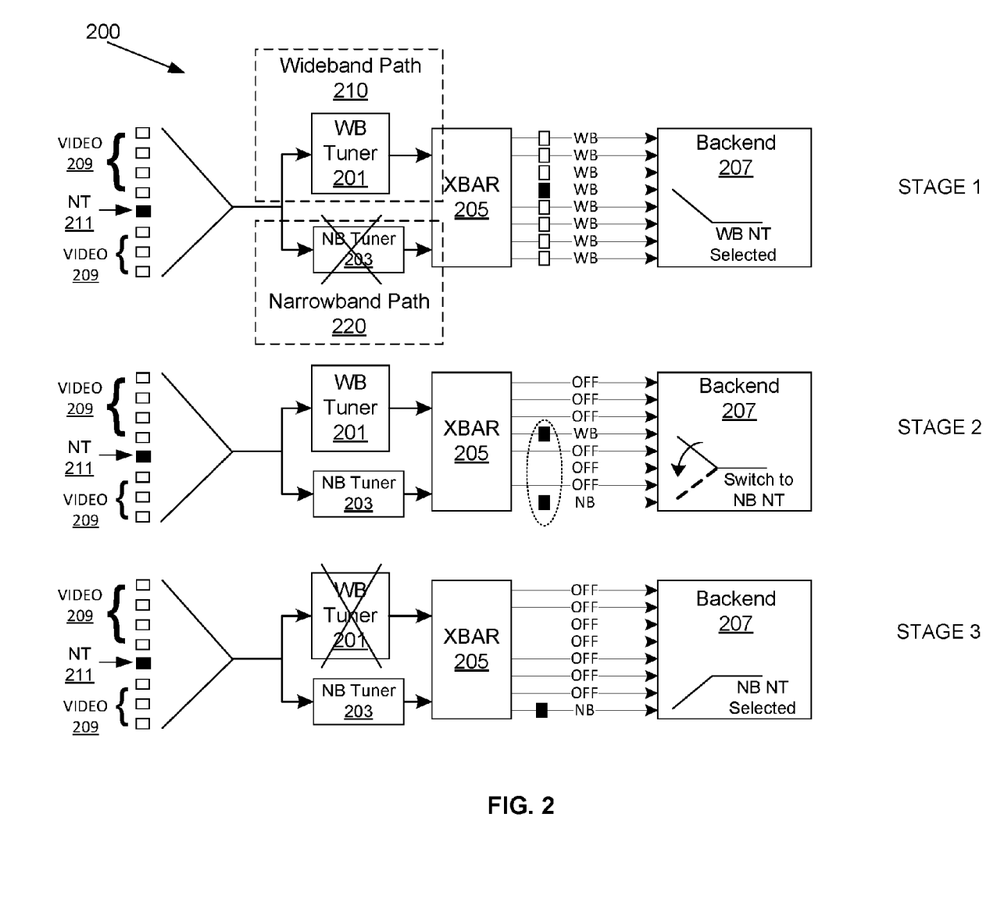
FIG. 2 illustrates an example receiver transition from video mode to network channel mode, in accordance with an embodiment of the invention.

FIG. 2 is a diagram illustrating an example dual mode radio frequency receiver, in accordance with an embodiment of the invention. Referring to FIG. 2, there is shown a receiver 200 comprising a wideband path 210 comprising a wideband tuner 201; a narrowband path 220 comprising a narrowband tuner 203; a crossbar 205; and a backend 207. There are also shown video channels 209 and data channels 211 as input signals to the wideband tuner 201 and the narrowband tuner 203. Furthermore, FIG. 2 shows the receiver 200 in three different stages, illustrating different power modes in which the receiver 200 may operate.

The wideband tuner 201 may comprise suitable circuitry for receiving a signal comprising a plurality of channels concurrently, i.e., at the same time, and selecting a desired channel for output to the crossbar 205. The wideband tuner 201 may be considered wideband in comparison to the narrowband tuner 203 in that it may receive the entire satellite television band, e.g., 950-1250 MHz, whereas the narrowband tuner 203 may be operable to tune to a single channel, such as a data, or network channel. Accordingly, the wideband tuner 201 may be operable to receive and tune to any channel across the satellite or cable television bands, for example, and may also be operable to tune to the network channel. In this manner, the network channel may be tuned by both the wideband tuner 201 and the narrowband tuner 203, thereby enabling a glitch free transition between a video tuning mode and a network channel tuning mode.

The narrowband tuner 203 may comprise circuitry for receiving signals in a narrow frequency band with an output signal sent to the crossbar 205. In an example scenario, the narrowband tuner 203 may be operable to receive network channel signals, such as the data channel 211, which may comprise data such as a programming guide, for example, which requires less bandwidth than the video channels 209. Accordingly, a wideband tuner is not needed to receive a network channel, although it has the capability to do so.

The crossbar 205 may comprise circuitry that is operable to select signals from a plurality of sources and switch them to any of a plurality of outputs. Accordingly, the crossbar 205 may comprise a plurality of switches that may be operable to select each of the plurality of input signals and route them to a desired output. For example, the crossbar 205 may be operable to select a signal from the wideband tuner 201 and route it to any of a plurality of outputs of the crossbar 205 such that it is communicated to a desired input on the backend 207.

The backend 207 may comprise circuitry for receiving and processing the received video channels 209 and network channel 211 and providing an output that may be suitable for display, such as on the HDTV 107, for example. Accordingly, the backend 207 may comprise audio and video decoders and video formatting capability for generating audio and video signals for display.

In operation, the receiver 200 may operate in three stages in transitioning from a video mode to a network channel mode, as represented by STAGE 1, 2, and 3 shown in FIG. 2. In stage 1, the receiver 200 may be configured to receive and process video and network channel signals, whereas in Stage 3, the receiver 200 may be configured to receive only network channel signals, resulting in a low power state for the receiver 200. Stage 2 may represent a transition stage where the receiver 200 is transitioning from a wideband mode of Stage 1 to a narrowband mode of Stage 3.

In Stage 1, the wideband tuner 201 may be configured in an active state while the narrowband tuner 203 may be in a low power, or off state, for example. The wideband tuner 201 may be operable to receive a plurality of video channels 209 as well as the network channel 211, while the crossbar 205 may be operable to select one or more video channels 209 and a network channel 211 from the wideband tuner 201, routing the output signals to a plurality of inputs on the backend 207.

The backend 207 may be configured to select the network channel communicated from the wideband tuner 201 via the crossbar 205, even though the narrowband tuner may be specifically for receiving the network channel 211. In this manner, in Stage 1, the narrowband tuner 203 may be powered down while the wideband tuner 201 remains on, which would be on in this stage anyway since it is also receiving the video channels 209 during this stage.

In Stage 2, the narrowband tuner 203 may be switched on, or taken out of a low power state, to tune to the network channel 211. In this stage, the network channel 211 may be received from both the wideband tuner 201 and the narrowband tuner 203, such that the backend 207 may switch from the wideband path 210 to the narrowband path 220, as illustrated by the switching process in the backend 207 in Stage 2. Since the network channel is being received from both the wideband and the narrowband paths at this time, the backend 207 may switch from selecting the wideband network channel to the narrowband network channel, without an interruption, or glitch, in the signal.

The transition from wideband to narrowband may be made in one of two locations. For example, the transition may occur at the backend 207 or alternatively may be made in the tuner stage, the wideband tuner 201 and the narrowband tuner 203. Accordingly, the switching may be at demodulator outputs in the tuners, and thus TS packet boundaries, as opposed to the backend 207. This second alternative may provide the advantage network tuner packets consistently being available from the same demodulator/TS packet interface.

In Stage 3, the wideband tuner 201 may be switched off or put into a low power state while the narrowband tuner 203 remains on and tuned to the network channel 211. In this manner, the receiver 200 may be in a low power state while still receiving network channel 211 data.

Figure 3:
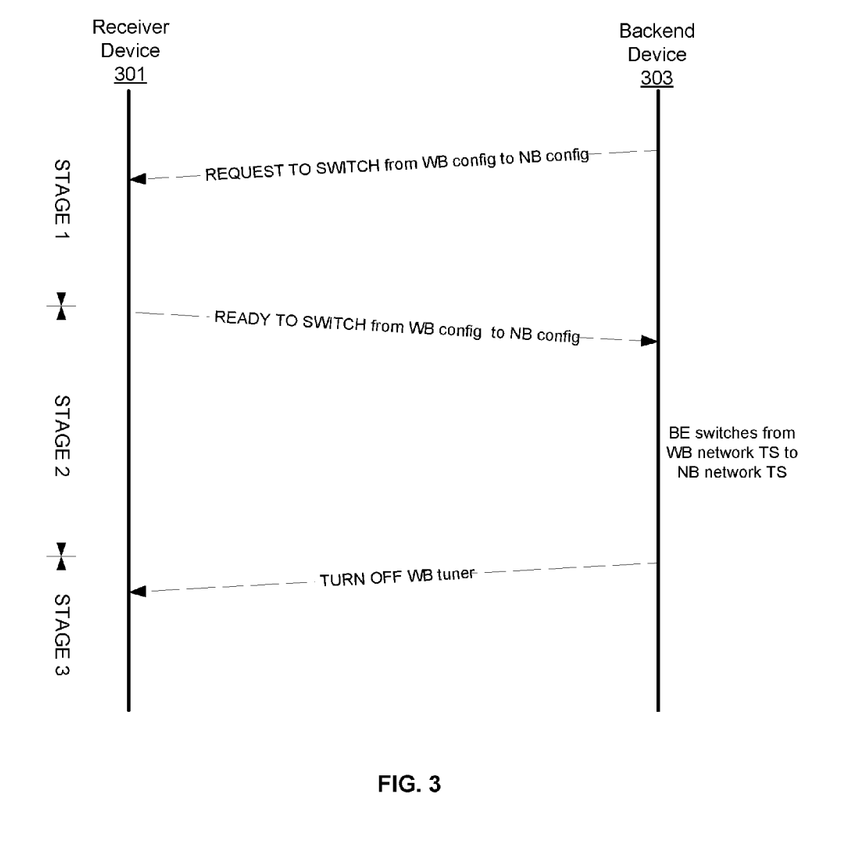
FIG. 3 is an example state transition diagram for a video mode to network channel mode transition, in accordance with an embodiment of the invention.

FIG. 3 is an example state transition diagram for a video mode to network channel mode transition, in accordance with an embodiment of the invention. Referring to FIG. 3, there is shown states for a receiver device 301 and a backend device 303. In an example scenario, the receiver device 301 may correspond to the wideband tuner 201, the narrowband tuner 203, and the crossbar 205, and the back end device 303 may correspond to the backend 207, shown in FIG. 2.

In stage 1, both network channel packets and video channel packets may be available from the wideband tuner. A request to switch from wideband configuration to narrowband configuration may be sent to the receiver device 301 from the backend device 303. In stage 2, video channels may be turned off first while leaving the network channel in the wideband tuner on, then the narrowband tuner may be turned on tuning to network channel. Note that in this stage, network channel packets may be available from both the wide-band tuner and the narrowband tuner. In stage 3, the network channel in the wideband tuner may be turned off, so that network channel packets may be available from the narrow-band tuner only, thereby reducing power usage.

Figure 4:
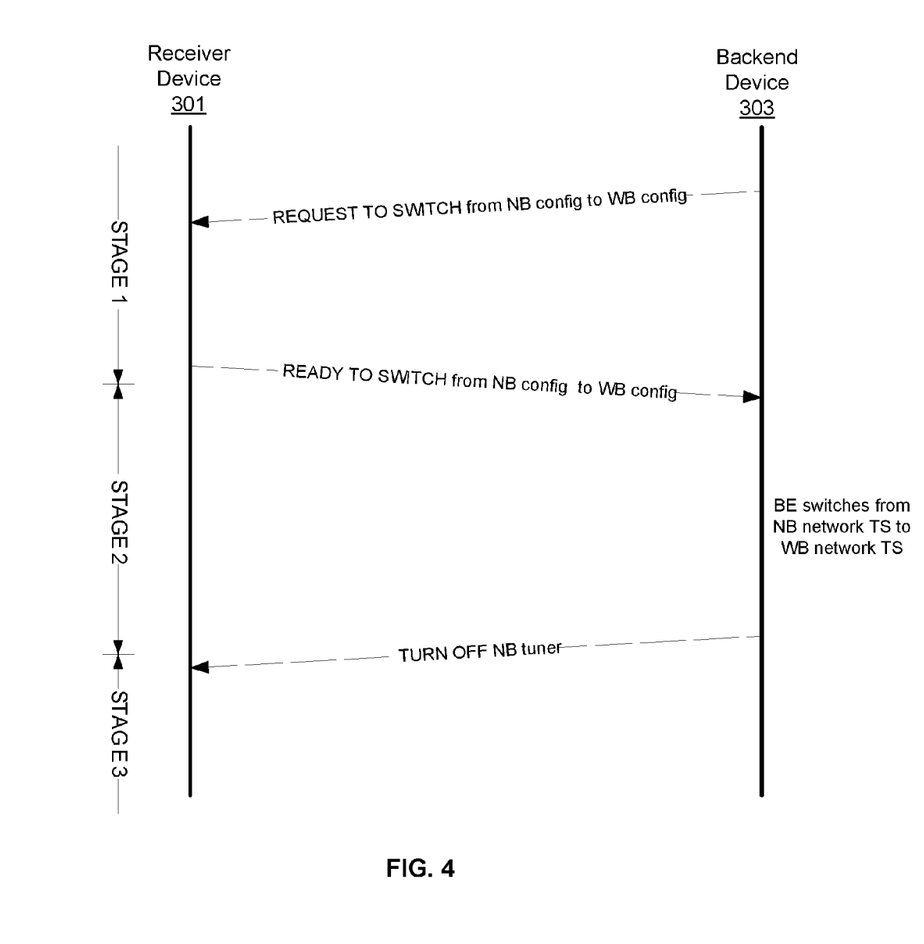
FIG. 4 illustrates an example transition from network channel mode to video mode, in accordance with an embodiment of the invention.

FIG. 4 illustrates an example transition from network channel mode to video mode, in accordance with an embodiment of the invention. Referring to FIG. 4, there is shown a state transition diagram for the receiver device 301 and the backend device 303.

In stage 1, network channel packets may be available from the narrow-band tuner. The backend device 303 may send a request to the receiver device 301 to switch from narrowband to wide-band configuration. In stage 2, the wideband tuner may be turned on, and tuned to a network channel and video channels. Note that in this stage, network channel packets may be available from both the wideband tuner and the narrowband tuner. The receiver device 301 may indicate it is ready to switch from narrowband configuration to wideband configuration. In stage 3, the network channel in the narrow-band tuner may be turned off. The network channel packets and video packets may thus be available from the wideband tuner in this stage while the narrow band tuner is off, thereby reducing power consumption.

Figure 5:
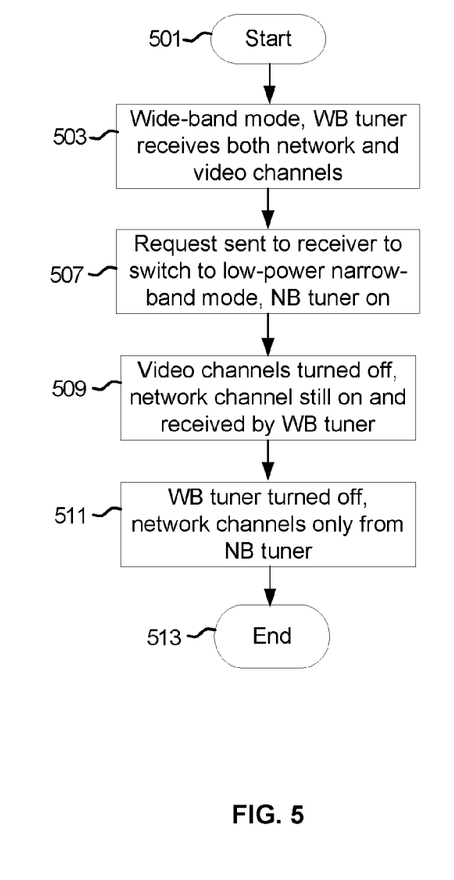
FIG. 5 is a flow diagram illustrating example steps in transitioning from a video mode to a network channel mode, in accordance with an embodiment of the invention.

FIG. 5 is a flow diagram illustrating example steps in transitioning from a video mode to a network channel mode, in accordance with an embodiment of the invention. The example method illustrated in FIG. 5 may, for example, share any or all functional aspects discussed previously with regard to FIGS. 1-4. Referring to FIG. 5, after start step 501, in step 503, the receiver may be in wideband mode with both network channel and video channels received by the wideband tuner.

In step 507, a request may be sent from the backend device to the receiver device to switch to a low-power narrowband mode and the narrowband tuner may be turned on, so that the network channel may be received by either the narrowband tuner or the wideband tuner. In step 509, the video channels may be turned off and the network channel may remain on and received by the wideband tuner or the narrowband tuner. In step 511, the wideband tuner may be turned off and the network channels may be received by the narrowband tuner, followed by end step 513.

Figure 6:
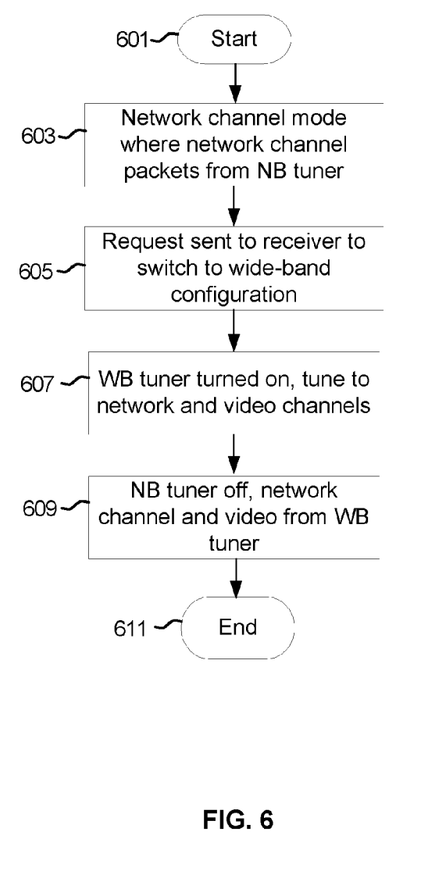
FIG. 6 is a flow diagram illustrating example steps in transitioning from a network channel mode to a video mode, in accordance with an embodiment of the invention.

FIG. 6 is a flow diagram illustrating example steps in transitioning from a network channel mode to a video mode, in accordance with an embodiment of the invention. The exemplary method illustrated in FIG. 6 may, for example, share any or all functional aspects discussed previously with regard to FIGS. 1-5. Referring to FIG. 6, after start step 601, in step 603, the receiver may be in network channel mode where the narrowband tuner may be on and receiving network channel packets while the wideband tuner may be off, such that no video channels are being received.

In step 605, a request may be sent by the backend device to the receiver device to switch to wideband configuration, followed by step 607, where the wideband tuner may be switched on and may tune to network and video channels. Network channels may be received by either the narrowband tuner or the wideband tuner at this stage, and the backend device may switch from selecting network channel packets from the narrowband tuner to selecting from the wideband tuner. In step 609, the narrowband tuner may be turned off and both network channels and video channels may be received by the wideband tuner only, followed by end step 611.

Figure 7:
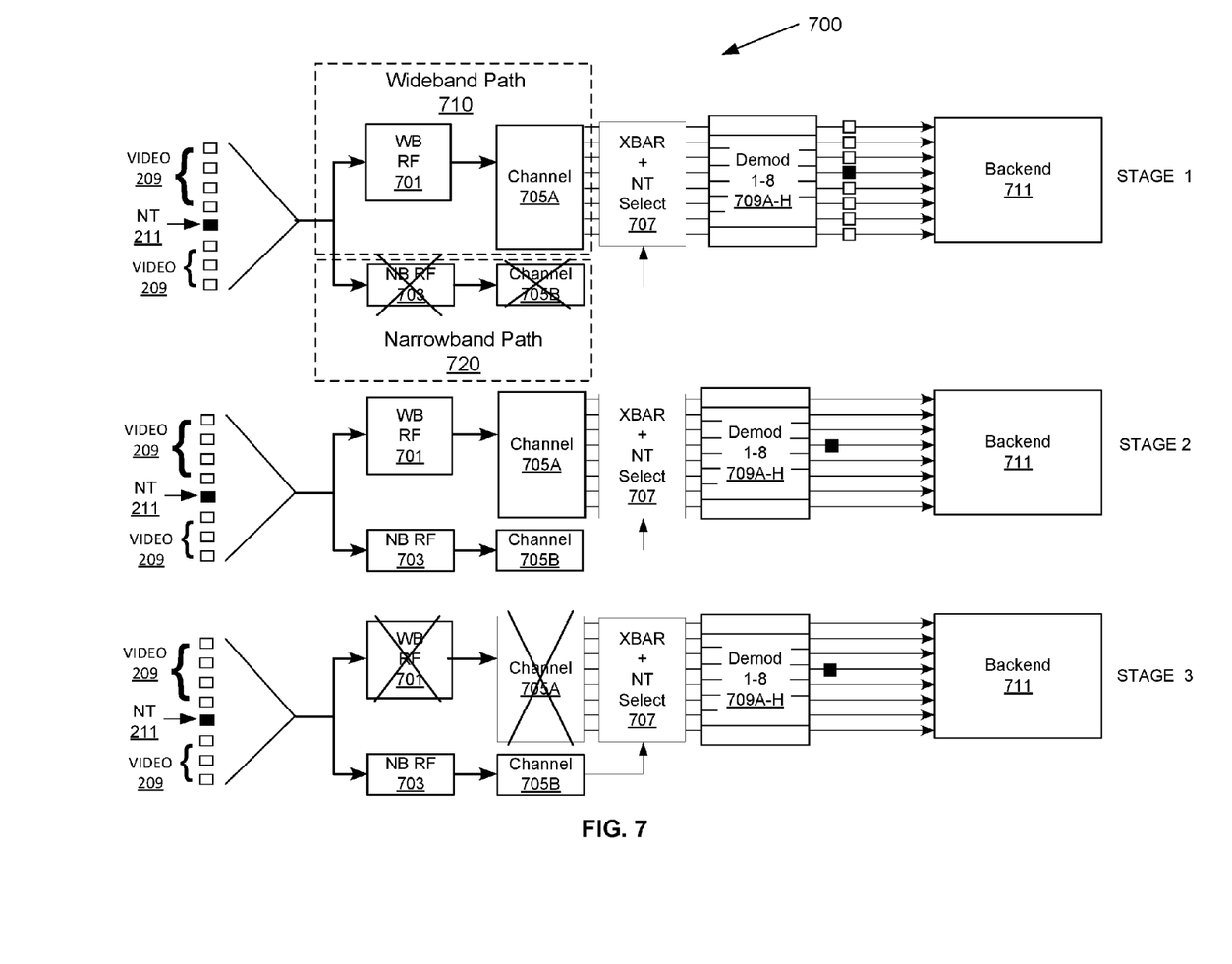
FIG. 7 is a block diagram illustrating an example receiver transition from video mode to network channel mode, in accordance with an embodiment of the invention.

FIG. 7 is a block diagram illustrating an example receiver transition from video mode to network channel mode, in accordance with an embodiment of the invention. Referring to FIG. 7, there is shown a receiver 700 in three different stages, STAGES 1-3, the receiver 700 comprising a wideband RF module 701, a wideband channelization module 705A, a narrowband RF module 703, a narrowband channelization module 705B, a crossbar and network channel selection module 707, demodulation modules 709A-709H, and a backend device 711. There is also shown the input video signals 209 and the network channel signal 211.

The wideband RF module 701 may be operable to process RF signals comprising a plurality of channels, including video and network channels, for example. Accordingly, the wideband RF module 701 may comprise amplifiers, filters, and down-conversion circuitry, for example, for receiving and processing RF signals of a sufficient bandwidth that comprises a plurality of video channels for subsequent channelization and demodulation.

The wideband channelization module 705A may be operable to receive a wideband signal from the wideband RF module 701 and create a plurality of sub-bands, or channels, for the received video and/or network channels to be communicated to the crossbar and network channel selection module 707.

Similarly, the narrowband RF module 703 may be operable to receive and process RF signals in a narrow frequency band, and the narrowband channelization module 705B may be operable to channelize the received signal, which may comprise a network channel, for example. The output of the channelization module 705B may be communicatively coupled to the crossbar and network channel selection module 707.

The crossbar and network channel select module 707 may be operable to receive a plurality of inputs and couple them to desired outputs that may be communicatively coupled to the demodulators 709A-709H. For example, the crossbar and network channel select module 707 may be operable to receive a plurality of video signals from the wideband channelization module 705A and a network channel from the narrowband channelization module 705B, or may receive both the video channels 209 and the network channel 211 via the wideband channelization module 705A. The crossbar and network channelization module 707 may be operable to switch the received signals such that the video channels are communicated to the demodulators 709A-709C and 709E-709H while the network channel is communicated to the demodulator 709D. The cross-bar may be operable to configure received data packets to a plurality of wideband channels communicated to the backend 711.

The demodulators 709A-709H may comprise circuitry, logic, and/or code for demodulating received signals to extract desired data, such as video/audio and network channel data, for example. Accordingly, the demodulators 709A-709H may be operable to demodulate quadrature amplitude modulation (QAM) signals and generate MPEG transport stream output signals, for example. However, the receiver 700 is not so limited. Accordingly, any decoding technology may be utilized depending on the video type and/or transport media utilized to deliver the signals. Furthermore, the demodulators 709A-709H may be operable to demodulate signals comprising network channel data to extract programming guide data, for example.

The backend 711 may comprise circuitry for receiving and processing the received video channels and a network channel and providing an output that may be suitable for display, such as on the HDTV 107, for example. Accordingly, the backend 711 may comprise audio and video decoders and video formatting capability for generating audio and video signals for display.

FIG. 7 illustrates the transition from a wideband mode in STAGE 1 to a narrowband mode in STAGE 3. In STAGE 1, the wideband RF module 701 and the wideband channelization module 705A may be activated, i.e. powered up, while the narrowband RF module 703 and the narrowband channelization module 705B may be in a powered down or low power state. In this manner, both video and network channel signals may be received without requiring both wideband and narrowband circuitry to be powered up.

In STAGE 2, both the wideband and the narrowband paths may be activated during a transition between narrowband and wideband configurations. In this state, the wideband RF module 701, the narrowband RF module 703, the wideband channelization module 705A, and the narrowband channelization module 705B may be in a powered up state and receiving signals. Since the network channel is being received from both the wideband and the narrowband paths 710 and 720 at this time, the crossbar and network channel select module 707 may switch from the network channel received from the wideband channelization module 705A to the network channel received from the narrowband channelization module 705B.

In STAGE 3, the wideband path 710 may be powered down or put into a low power state while the narrowband path 720 continues to receive the network channel 211. This transition from STAGE 1 to STAGE 3 may occur when the a set top box comprising the receiver 700 is powered off by a user, where video channels are no longer to be viewed but the network channel 211 is still to be received to update the programming guide, for example.

In this example scenario, the transition may still be performed during STAGE 2, as in FIG. 2, but the switching may be at the channelization/demodulation interface, between the channelization modules 705A/705B and the demodulators 709A-709H, instead of the TS packet interface between the wideband and narrowband tuners 201 and 203 and the backend 207. One advantage of this scheme is that network tuner packets are thus always available from the same demodulator 709A-709H TS packet interface at the backend 711, indicated by the blackened square at the output of demodulator 709D.

In an embodiment of the invention, a method and system may comprise a communication device 103 comprising a wideband path 210, 710 and a narrowband path 220, 720, wherein the wideband path 210, 710 may be operable to receive a plurality of channels and the narrowband path 220, 720 may be operable to receive a single channel. A plurality of video channels 209 and a network channel 211 may be received in the wideband path 210, 710 when the communication device 103 is operating in a first stage, STAGE 1. A plurality of video channels 209 and a network channel 211 may be received in the wideband path 210, 710 and the network channel 211 may also be received in the narrowband path 220, 720 when the communication device 103 is operating in a second stage, STAGE 2.

The network channel 211 may be received in the narrowband path 220, 720 when the communication device 103 is operating in a third stage, STAGE 3. The second stage, STAGE 2, may comprise a transition from the first stage, STAGE 1, to the third stage, STAGE 3, and from the third stage, STAGE 3, to the first stage, STAGE 1. The wideband path 210 may comprise a wideband tuner 201 that is operable to tune to a plurality of channels concurrently and said narrowband path 220 may comprise a narrowband tuner 203 that is operable to tune to a single channel at a time. The wideband path 710 may comprise a wideband radio frequency (RF) module 701 and a wideband channelization module 705A and the narrowband path 720 may comprise a narrowband RF module 703 and a narrowband channelization module 705B.

A network channel may be selected from the network channel received by the wideband channelization module 705A and the network channel received by the narrowband channelization module 705B utilizing a crossbar 707. One or more of the received video channels may be processed utilizing a backend module 207, 711 in the communication device 103 for output to a display device 107.

The narrowband path 220, 720 may be configured in a powered down state when the communication device 103 is operating in the first stage, STAGE 1, and the wideband path 220, 720 may be configured in a powered down state when the communication device 103 is operating in the third stage, STAGE 3. The reception of the network channel 211 from both the wideband path 210, 710 and the narrowband path 220, 720 may enable a continuous reception of the network channel 211 in a transition between the first stage, STAGE 1. and the third stage, STAGE 3.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for multi-path video and network channels.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for communication, the method comprising:
   in a communication device comprising a wideband path and a narrowband path:
   receiving a video channel and a network channel in said wideband path when said communication device is operating in a first stage;
   receiving a video channel and a network channel in said wideband path and also receiving said network channel in said narrowband path when said communication device is operating in a second stage; and
   receiving said network channel in said narrowband path when said communication device is operating in a third stage.

2. The method according to claim 1, wherein said wideband path comprises a wideband tuner that is operable to tune to a plurality of channels concurrently and said narrowband path comprises a narrowband tuner that is operable to tune to a single channel at a time.

3. The method according to claim 1, wherein said wideband path comprises a wideband radio frequency (RF) module and a wideband channelization module and said narrowband path comprises a narrowband RF module and a narrowband channelization module.

4. The method according to claim 3, comprising selecting either said network channel received by said wideband channelization module or said network channel received by said narrowband channelization module, utilizing a crossbar.

5. The method according to claim 1, comprising processing said received video channel utilizing a backend module in said communication device for output to a display device.

6. The method according to claim 1, comprising configuring said narrowband path in a powered down state when said communication device is operating in said first stage.

7. The method according to claim 1, comprising configuring said wideband path in a powered down state when said communication device is operating in said third stage.

8. The method according to claim 1, wherein said receiving said network channel from both said wideband path and said narrowband path enables a continuous reception of said network channel in a transition between said first stage and said third stage.

9. A system for communication, the system comprising:
   one or more circuits for use in a communication device comprising a wideband path and a narrowband path, said one or more circuits are operable to:
   receive a video channel and a network channel in said wideband path when said communication device is operating in a first stage;
   receive a video channel and a network channel in said wideband path and also receive said network channel in said narrowband path when said communication device is operating in a second stage; and
   receive said network channel in said narrowband path when said communication device is operating in a third stage.

10. The system according to claim 9, wherein said wideband path comprises a wideband tuner that is operable to tune to a plurality of channels concurrently and said narrowband path comprises a narrowband tuner that is operable to tune to a single channel at a time.

11. The system according to claim 9, wherein said wideband path comprises a wideband radio frequency (RF) module and a wideband channelization module and said narrowband path comprises a narrowband RF module and a narrowband channelization module.

12. The system according to claim 11, comprising selecting either said network channel received by said wideband channelization module or said network channel received by said narrowband channelization module, utilizing a crossbar.

13. The system according to claim 9, wherein said one or more circuits are operable to process said received video channel utilizing a backend module in said communication device for output to a display device.

14. The system according to claim 9, wherein said one or more circuits are operable to configure said narrowband path in a powered down state when said communication device is operating in said first stage and to configure said wideband path in a powered down state when said communication device is operating in said third stage.

15. The system according to claim 9, wherein said receiving said network channel from both said wideband path and said narrowband path enables a continuous reception of said network channel in a transition between said first stage and said third stage.

16. A system for communication, the system comprising:
one or more circuits for use for use in a communication device comprising a wideband path and a narrowband path, wherein said wideband path is operable to receive a plurality of channels and said narrowband path is operable to receive a single channel, said one or more circuits being operable to:
receive a video channel and a network channel in said wideband path when said communication device is operating in said first stage;
receive a video channel and a network channel in said wideband path and also receive said network channel in said narrowband path when said communication device is operating in a second stage; and
receive said network channel in said narrowband path when said communication device is operating in said third stage.

17. The system according to claim 16, wherein said wideband path comprises a wideband radio frequency (RF) module and a wideband channelization module and said narrowband path comprises a narrowband RF module and a narrowband channelization module.

18. The system according to claim 17, comprising selecting either said network channel received by said wideband channelization module or said network channel received by said narrowband channelization module, utilizing a crossbar.

19. The system according to claim 16, comprising processing said received video channel utilizing a backend module in said communication device for output to a display device.

20. The system according to claim 16, comprising configuring said narrowband path in a powered down state when said communication device is operating in said first stage.

21. The system according to claim 16, comprising configuring said wideband path in a powered down state when said communication device is operating in said third stage.

22. The system according to claim 16, wherein said receiving said network channel from both said wideband path and said narrowband path enables a continuous reception of said network channel in a transition between said first stage and said third stage.

* * * * *